United States Patent [19]

Mikogami et al.

[11] 4,309,512

[45] Jan. 5, 1982

[54] HEAT-RESISTANT THERMOSETTING RESIN COMPOSITION

[75] Inventors: Yukihiro Mikogami, Yokohama; Takeo Ito, Kawasaki; Moriyasu Wada, Kanagawa, all of Japan

[73] Assignee: Tokyo Shibaura Denki Kabushiki Kaisha, Kanagawa, Japan

[21] Appl. No.: 212,354

[22] Filed: Dec. 3, 1980

[30] Foreign Application Priority Data

Dec. 26, 1979 [JP] Japan ................... 54-168168

[51] Int. Cl.³ ............................................. C08L 29/04
[52] U.S. Cl. ..................................... 525/58; 428/417; 428/418
[58] Field of Search ............................................ 525/58

[56] References Cited

U.S. PATENT DOCUMENTS

| | | | |
|---|---|---|---|
| 2,713,567 | 7/1955 | Scheibli | 525/58 |
| 3,098,054 | 7/1963 | Rosenberg | 525/58 |
| 3,172,921 | 3/1965 | Flowers | 525/58 |
| 4,131,707 | 12/1978 | Zahir | 526/303 |
| 4,248,977 | 2/1981 | Wertz | 525/58 |

*Primary Examiner*—Paul Lieberman
*Attorney, Agent, or Firm*—Schwartz, Jeffery, Schwaab, Mack, Blumenthal & Koch

[57] ABSTRACT

A thermosetting resin composition containing as essential resin components (a) a maleimide compound modified with furfuryl alcohol, (b) an epoxy resin and (c) a polyvinyl formal, and a latent curing agent or a curing accelerator which is at least one compound selected from the group consisting of dicyandiamide, boron trifluoride-amine complexes, metal chelate compounds, and silicone compounds and organo-silane compounds having at least one hydroxyl group bonded directly to silicon atom, is found to be capable of B-staging with good storage stability and provides a heat-resistant resin composition having excellent electric characteristics at high temperatures after curing. The composition can suitably be coated on a glass cloth or a mica tape to give a pre-preg tape which can maintain its flexibility for a long time.

4 Claims, No Drawings

HEAT-RESISTANT THERMOSETTING RESIN COMPOSITION

This invention relates to a heat-resistant thermosetting resin composition capable of B-staging and also exhibiting excellent electric insulating property at high temperatures after curing. More particularly, the present invention pertains to a heat-resistant thermosetting resin composition, comprising three resin components, namely a maleimide compound modified with furfuryl alcohol, an epoxy resin and a polyvinyl formal, together with additives of a specific latent curing agent and/or curing accelerator.

With miniturization and capacity magnification of electric instruments, increasing attention has been called on heat-resistant resins as electric insulating materials. Referring now to one embodiment of application of heat-resistant resins as insulating materials, there is an embodiment wherein a mica paper, a cloth or a tape made of heat-resistant fibers is used in combination with a heat-resistant resin for winding. That is, a substrate of a mica paper, a glass cloth or tape is impregnated or coated with a resin to prepare a bind tape. By use of such a bind tape, coil terminals, for example, may be wound to be secured firmly. When a heat-resistant resin is used for such a bind tape, it is desirable that said resin should maintain properties of half-cured state (B-stage) and has sufficient flexibility for winding operation. It is also desirable that the resin should easily be cured by melting and softening uniformly during heat curing without causing flowing out and also that it should have excellent electric insulating property, mechanical characteristics and heat-resistance.

There have generally been employed epoxy resins as the resin for such a bind tape as mentioned above. In this case, however, the heat-resistance only to the extent of 155° C. (Class - F) at the highest may be observed and there is remarkable deterioration of mechanical strength, whereby no satisfactory insulating function can be exhibited. For improvement of this drawback, there is an attempt to use, for example, a bis-maleimide type resin or a bis-maleimide type resin composition. Said bis-maleimide type resin composition is excellent in heat resistance and therefore disadvantageous deterioration of properties at higher temperatures can be removed. However, such a resin composition is liable to be hardened (flexibility disappeared) at B-stage or pre-preg state, whereby winding operation is difficult and there may be caused generation of cracks during winding operation. For this reason, said resin composition can find only limited uses.

Further, there have been various attempts to improve the characteristics of the resin by adding various components. For example, Japanese Patent Publication No. 11359/1973 discloses a liquid thermosetting composition obtained by the reaction between an epoxy resin, a carboxylic acid anhydride and a bis-maleimide compound. This composition is substantially different from the present invention in using a carboxylic acid anhydride as essential component.

U.S. Pat. No. 4,131,707 discloses a hardenable liquid composition comprising a bis-maleimide compound, a comonomer for bis-maleimide (e.g., poly-primary amine, polybasic phenol, polycarboxylic acid) and a polymerization catalyst, to which is further added a furyl containing compound such as furfuryl alcohol. This composition is substantially distinguished from the present invention in using a combination of a bis-maleimide with its comonomer.

Any of these resinous compositions of prior art is still insufficient in heat-resistance of hardened resins and operating characteristics under the state of B-stage or pre-preg.

The object of the present invention is to provide a heat-resistant resin composition capable of B-staging and has excellent electric insulating characteristic and mechanical characteristics after hardening which can suitably be used for constitution of a bind tape even at a high temperature of 180° C. (Class - H).

In accordance with the present invention, there is provided a heat-resistant resin composition, comprising a resin system essentially consisting of (a) a maleimide compound modified with furfuryl alcohol, (b) an epoxy resin and (c) a polyvinyl formal and, incorporated therein as a latent curing agent or a curing accelerator, at least one compound selected from the group consisting of dicyandiamide, brown trifluorideamine complexes, metal chelate compounds, and silicone compounds and organosilane compounds having at least one hydroxyl group bonded directly to silicon atom.

In the following, each constituting element of the present invention is to be described in detail.

Resin component (a)

The maleimide type compounds which can be modified with furfuryl alcohol so as to be provided for use as one component in the present invention may be represented by the following formula:

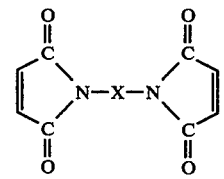

wherein X is a divalent hydrocarbon group such as an alkylene group having 2 to 16 carbon atoms, a cycloalkylene group constituted of a mono-cyclic or a polycyclic ring of 5-membered or 6-membered rings, a monocyclic or a polycyclic arylene group, or a divalent hydrocarbon group bonded through a divalent atomic group such as —CH$_2$—, —CO—, —SO$_2$—, —CONH—, etc.

There may also be included those comprising principally maleimide compounds prepared from the reaction between maleic acid anhydride and mixed polyamines represented by the formula:

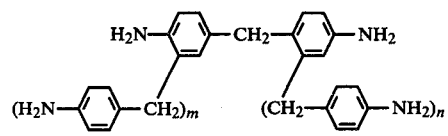

wherein m and n represent integers of 0 to 4.

Said classes of maleimide type compounds may be exemplified typically by N,N'-phenylene-bis-maleimide, N,N'-hexamethylene-bis-maleimide, N,N'-methylene-di-p-phenylene-bis-maleimide, N,N'-oxy-di-p-phenylene-bis-maleimide, N,N'-4,4'-benzophenone-bis-maleimide, N,N'-(3,3'-dimethyl)-methylene-di-p-phenylene-bis-maleimide, N,N'-4,4'-dicyclohexylmethane-bis-maleimide, N,N'-m(or p)-xylene-bis-maleimide, N,N'-

(3,3'-diethyl)-methylene-di-p-phenylene-bis-maleimide, N,N'-m-toluylene-bis-maleimide, and the like. Further, there may be mentioned reaction products of mixed polyamines, which are reaction products between aniline and formalin, with maleic acid anhydride, and also mono-maleimide compounds such as N-allyl-maleimide, N-propyl-maleimide, N-hexyl-maleimide, N-phenyl-maleimide, and so on. The resin component (a) is prepared by modification of these compounds with furfuryl alcohol. These modified maleimide compounds may be used as a single species or as a mixture of two or more species, in an amount within the range from 5 to 40% by weight, preferably from 10 to 30% by weight based on the total resin components.

In the above modification, the maleimide compounds can be modified with furfuryl alcohol to exhibit excellent effects for dissolving other resins and curing agents homogeneously and stably. For such a modification, furfuryl alcohol may sufficiently be added in an amount of 2.0 to 35 parts by weight, preferably from 5 to 15 parts by weight, per 100 parts by weight of a maleimide compound.

Resin component (b)

An epoxy type resin, which is another component in the present invention, refers to a compound having at least one oxirane ring. As such epoxy type resins, there may be mentioned, for example, bisphenol A type epoxy resins; bisphenol F type epoxy resins; phenol-novolac type epoxy resins; cresol-novolac type epoxy resins; alicyclic epoxy resins; epoxy resins containing heterocyclic rings such as tri-glycidyl-isocyanurate or hydantoinepoxy; hydrogenated bisphenol A type epoxy resins; aliphatic epoxy resins such as propyleneglycol-diglycidylether or pentaerythritol-polyglycidylether; epoxy resins obtained by the reaction between aromatic carboxylic acid and epichlorohydrin; epoxy resins containing spiroring; glycidyl ether type epoxy resins, which are the reaction products between o-aryl-phenol-novolac compounds and epichlorohydrin; glycidyl ether type epoxy resins, which are the reaction products between diallyl bisphenol compounds having allyl groups at ortho-positions of hydroxyl groups of bisphenol, respectively, and epichlorohydrin; and so forth. These epoxy resins, which may be used either as a single spiecies or a combination of two or more species, should be contained in the composition in an amount of 30 to 70% by weight, preferably 40 to 60% by weight, based on the total resin components.

Resin component (c)

In the present invention, there is used another resin component, namely polyvinyl formal, which is considered to contribute to increase of viscosity of a solubilized composition and also to adhesiveness to a substrate under so called pre-preg state after B-staging. Said polyvinyl formal should desirably have a molecular weight of 20,000 to 100,000, preferably 40,000 to 60,000, and a formalization degree of 40% or more, preferably 80% or more. It is desirable to incorporate said polyvinyl formal in an amount of 2 to 30% by weight, preferably 3 to 15% by weight based on the total resin components. This component may be added also during the stage of modification reaction of a maleimide compound with furfuryl alcohol.

Curing agent or curing accelerator

According to the present invention, there is added to the above essential resin components at least one latent curing agent or curing accelerator selected from the group consisting of dicyandiamide, boron trifluoridea-mine complexes (e.g., boron trifluoride-piperidine complex, boron trifluoride-mono-ethylamine complex, etc.), metal chelate compounds and silicone compounds having one or more hydroxyl groups directly bonded to silicon atom (including organosilane compounds). Such a curing agent may be added in an amount of not more than 5 parts by weight per 100 parts by weight of the epoxy type resin.

Among these curing agents or curing accelerators, metal chelate compounds and silicone type compounds are to be further illustrated hereinafter.

The metal chelate compounds to be used in the present invention may be represented by the following formula:

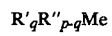

wherein R' is an alkoxy group or an acyloxy group; R" an alkylacetoacetate or acetyl acetone; q an integer of 0 to 3; p an integer of 1 to 4; and Me a metal element such as Al, Fe, Ni, Cu, Ti, Co, Mn, etc.

Typical examples of such compounds are Al(acac) (C$_2$H$_5$O)$_2$, Al(acac)$_3$, Ni(acac)$_2$, Mn(acac)$_2$, Fe(acac)$_3$, and the like (wherein "acac" means acetyl acetone). Such a metal chelate compound may be added sufficiently in an amount of 0.0001 to 5.0 parts by weight per 100 parts by weight of the epoxy resin component. The silicone compound having SiOH which may be used as curing accelerator in the present invention is represented by the following formula:

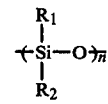

wherein each of R$_1$ and R$_2$ represents a hydrogen atom, an alkyl group, an aromatic group, an unsaturated group or a haloalkyl group.

Typical examples are,

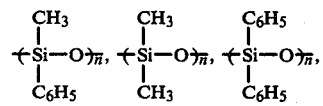

and copolymers thereof. As mentioned above, these compounds are required to contain at least one hydroxyl group directly bonded to silicon atom. A part of the substituents may also have partially branched alkoxy groups or silicones. These silicone compounds are not required to have a uniform molecular weight, but there may be employed any compound having a molecular weight varying from low molecular weight to high molecular weight. Such a silicone compound may be added in the composition sufficiently in an amount of 0.0001 to 5.0 parts by weight per 100 parts by weight of the epoxy resin component.

The organosilane compound which can be used in the present invention as a curing accelerator is represented by the following formula:

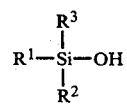

wherein each of $R^1$, $R^2$ and $R^3$ represents an organic group such as an alkyl group having 1 to 6 carbon atoms, a substituted or unsubstituted aromatic group, an alkoxy group such as methoxy, ethoxy, or propoxy or an aryloxy group such as phenoxy.

Such an organosilane compound may also be added sufficiently in an amount of 0.0001 to 5.0 parts by weight per 100 parts by weight of the epoxy resin component.

The resin composition according to the present invention, while it may also be used as a non-solvent type, may be dissolved in a solvent such as dioxane, cellosolve or methyl ethyl ketone, then subjected to heating reaction, if desired, and thereafter coated on a glass cloth or a mica tape, followed by drying, to provide a pre-preg tape. The pre-preg tape thus prepared is found to have good storage stability and also have a suitable viscosity of the resin system when subjected to heat curing, providing a hardened product having good appearance without drip-off of excessive resin composition.

The present invention is further illustrated with reference to the following Examples.

EXAMPLE 1

In a separable flask, there were charged 100 g. of dioxane, 30.6 g. of N,N'-methylene-p-phenylene-bis-maleimide (produced by Mitsui Toatsu Co., Ltd. Japan) and 1.58 g. of furfuryl alcohol, and the reaction was continued at 120° C. for 2 hours to prepare a homogeneous solution of a furfuryl alcohol-modified bis-maleimide. In this solution, there were added and dissolved 45.46 g. of a bisphenol A type epoxy resin (Epikote 828: Shell Chemical Co.), 11.36 g. of a novolac type epoxy resin (Epikote 152: Shell Chemical Co.) and 8.74 g. of a polyvinyl formal resin containing 81.0% more of polyvinyl formal and having a furfural viscosity of 400 to 700 cps (Vinylek E: trade name produced by Chisso, Co., Ltd., Japan). Then, to the resultant solution, there were further added and dissolved 0.62 g. of aluminum tris-acetyl acetonate, 0.62 g. of a silicone resin containing SiOH groups TSR-108 (Toshiba Silicone: trade name) and 0.61 g. of a silane coupling agent γ-glycidoxypropyl-tri-methoxysilane A-187 (trade name, produced by Union Carbide Co.), followed by cooling of the solution. The thus prepared insulating varnish was coated on an aluminum plate, dried on air and cured at 200° C. for 15 hours, whereby there was obtained a smooth coated film with luster. The coated film was found to have the excellent electric characteristics and heat resistance as shown in Table 1.

EXAMPLES 2-3

To the reaction mixtures prepared similarly as in Example 1 having the indicated compositions as shown in Table 1, there were added the curing agents to prepare respective insulating coating materials for pre-preg. These coating materials were coated through impregnation onto glass cloths (thickness: 0.18 mm) treated with aminosilane, followed by drying on air at 100° C. for 10 minutes, to prepare pre-pregs. The thus prepared pre-pregs were found to possess sufficient flexibility and curability even after storage for 30 days. These pre-pregs were cut into sizes of 20 cm.×20 cm. and ten-ply layers thereof were subjected to press at 180° C. under 40 kg/cm² for 3 hours to give glass-cloth laminates. These laminates were found to have good electric characteristics, bending strengths and thermal stability as shown in Table 1.

EXAMPLE 4

In a separable flask, there were charged 70.06 g. of dioxane, 30.08 g. of N,N'-methylene-p-phenylene-bis-maleimide and 2.4 g. of furfuryl alcohol and the reaction was conducted at 110° C. for 2 hours to prepare a homogeneous solution. To this solution, there were added 36.68 g. of Epikote 828, 39 g. of Epikote 152 and 6.12 g. of Epikote 154 (Novolac type epoxy resin: produced by Shell Chemical Co., Ltd.) and 12.06 g. of polyvinyl formal. The mixture was heated at 120° C. for one hour to obtain a transparent solution. The solution was cooled to 100° C., whereat 2.28 g. of dicyandiamide was added thereto and the mixture was maintained at said temperature for 30 minutes. Further, after cooling the mixture to 80° C., 1.32 g. of boron trifluoride-monoethylamine was dissolved therein and the resultant mixture was cooled to room temperature to obtain the desired insulating varnish.

The thus prepared resin solution was coated, dried on air and thereafter cured at 180° C. for 15 hours to give a smooth coated film. The electric characteristics of this coated film are shown in Table 1.

Then, the resin solution was coated by impregnation onto 0.18 mm. thick glass cloth treated with aminosilane, dried on air and thereafter dried at 100° C. for 10 minutes to obtain a pre-preg. The thus prepared pre-preg was found to possess sufficient flexibility and curability even after storage for 50 days at 15° C. The pre-preg was cut into sizes of 20 cm.×20 cm., and ten-ply layers thereof were subjected to press at 180° C. under 40 kg/cm² for 2 hours to prepare a glass cloth laminate. The laminate was subjected to post-curing at 180° C. for 15 hours, and thereafter bending strength was measured to give the good result as shown in Table 1.

TABLE 1

| | Example 1 | Example 2 | Example 3 | Example 4 |
|---|---|---|---|---|
| Recipe: | | | | |
| Epikote 828 | 22.73% | 22.56% | 17.22% | 36.68% |
| Epikote 152 | 5.68 | 22.56 | 17.21 | 39.00 |
| Epikote 154 | — | — | — | 6.12 |
| Bismaleimide M 20 *-1 | 15.30 | 15.04 | 18.54 | 30.08 |
| Furfuryl alcohol | 0.79 | 1.20 | 0.95 | 2.40 |
| Polyvinyl formal *-2 | 4.37 | 1.81 | 5.30 | 12.06 |
| Dioxane | 50.00 | 35.02 | 40.00 | 70.06 |
| Boron trifluoride-mono-ethyl amine | 0 | 0.66 | 0.32 | 1.32 |
| Dicyandiamide | 0 | 1.14 | 0 | 2.28 |
| Al(acac)₃ | 0.31 | — | 0.05 | — |
| Silicon resin | 0.31 | — | 0.10 | — |
| Silane coupling agent | 0.51 | — | 0.31 | — |
| Pre-preg formation: Glass cloth | — | 100° C., 10 min. | 100° C., 10 min. | 100° C., 10 min. |
| tape-pre-preg stability: | — | No change after 30 days | No change after 30 days | No change after 30 days |
| Curing conditions: | 200° C., 15 hrs. | 180° C., 3 hrs. | 180° C., 3 hrs. | 180° C., 15 hrs. |
| Electric character- | | | | |

TABLE 1-continued

| | Example 1 | Example 2 | Example 3 | Example 4 |
|---|---|---|---|---|
| istics: Volume resistance: | | | | |
| 25° C. ($\Omega \cdot$ cm) | $2.0 \times 10^{16}$ | $2.2 \times 10^{16}$ | $1.6 \times 10^{16}$ | $1.0 \times 10^{16}$ |
| 150° C. | $2.0 \times 10^{15}$ | $1.3 \times 10^{12}$ | $4.5 \times 10^{14}$ | — |
| 200° C. | $3.9 \times 10^{13}$ | — | $7.3 \times 10^{11}$ | $4.4 \times 10^{11}$ |
| 250° C. | $4.1 \times 10^{11}$ | — | — | — |
| Electric characteristics: Dielectric tangent (%): | | | | |
| 25° C. | 0.5 | 0.5 | 0.5 | 0.6 |
| 150° C. | 0.6 | 23.1 | 5.3 | 23.8 |
| 200° C. | 1.2 | — | 19.5 | — |
| 250° C. | 3.4 | — | — | — |
| Bending strength of the laminates (thickness: 1.6mm), kg/mm$^2$: | | | | |
| 25° C. | — | 65.3 | 55.4 | 60.7 |
| 150° C. | — | 44.5 | 30.8 | 38.6 |
| 200° C. | — | 28.6 | 24.9 | 25.4 |
| 250° C. | — | 20.2 | 18.5 | 19.9 |
| Deterioration at 25° C., for 30 days: | — | 71.5 | 67.3 | 66.4 |
| Thermogravimetric analysis (weight loss %): | | | | |
| 300° C. | 1 | 2 | 1 | 3 |
| Heating speed, 5° C./min: | | | | |
| 350° C. | 9 | 11 | 6 | 13 |

Note
*-1 polyvalent maleimide compound (trade name, produced by Mitsui Toatsu Co., Ltd.)
*-2 Vinylek E (trade name, produced by Chisso Co., Japan)

EXAMPLE 5

Using a pilot plant, 50 kg. of the same test samples of varnish as prepared in Example 4 were prepared. This varnish was coated on a glass roving to obtain a bind tape of 100 m. in length and 19 mm. in width (resin content: 30±2%). The thus prepared tape was found to have sufficient flexibility and suitable tackiness so that there occurred no thread splitting. Ring model tensile strengths (7 mm width per one layer) of this bind tape were measured to be 205 kg. at room temperature, 160 kg. at 180° C., 158 kg. at 230° C., thus indicating excellent quality for practical application.

EXAMPLE 6

A resin solution was prepared under the same reaction conditions as in Example 4 except for using boron trifluoride-piperidine in place of boron trifluoridemonoethylamine. This varnish was coated on a glass tape and dried at 100° C. for 10 minutes to obtain a pre-preg, which was found to show no lowering in operability even after standing to left for 30 days. The coated film prepared similarly as in Example 4 had a volume resistance at 25° C. of $2.2 \times 10^{16}$ ohm.cm and a dielectric tangent of 0.8%. A glass layered plate (thickness: 1.6 mm) prepared by pressing ten-ply layers of pre-pregs at 180° C. for 3 hours had a bending strength of 54 kg/mm$^2$ at 25° C. and 22.2 kg/mm$^2$ at 200° C.

COMPARATIVE EXAMPLE 1

In 70.0 g. of dioxane, there were dissolved under stirring 35.8 g. of N,N'-methylene-p-phenylene-bis-maleimide, 20.0 g. of diaminodiphenylmethane, and 36.0 g. of Epikote 828. The reaction was carried out at 110° C. for 2 hours. The resultant solution was cooled to room temperature and then coated on a glass roving tape, followed by drying at 120° C. for 15 minutes, to obtain a pre-preg tape. The thus prepared tape was found to be poor in flexibility and there was also thread splitting in the roving, thus failing to be useful as bind tape.

COMPARATIVE EXAMPLE 2

A mixture containing 35.8 g. of N,N'-methylene-p-phenylene-bis-maleimide, 18.0 g. of Epikote 828, 21.0 g. of Epikote 1001, 25.0 g. of methyltetrahydrophthalic acid anhydride and 0.3 g. of benzyl dimethylamine was heated to 90° to 100° C. until a homogeneous mixture was obtained. The homogeneous mixture was maintained at said temperature for additional 30 minutes, followed by addition of 100 g. of dioxane to obtain a 50% solution. The storage stability of the thus prepared varnish was found to be about 10 days at room temperature. The varnish was also coated on a glass cloth and dried at 100° C. for 10 minutes to obtain a pre-preg, which was solidified after 6 days and cannot be used.

What we claim is:

1. A heat-resistant resin composition, comprising a resin system essentially consisting of (a) a maleimide compound modified with furfuryl alcohol, (b) an epoxy resin and (c) a polyvinyl formal and, incorporated therein as a latent curing agent or a curing accelerator, at least one compound selected from the group consisting of dicyandiamide, boron trifluoride-amine complexes, metal chelate compounds, and silicone compounds and organo-silane compounds having at least one hydroxyl group bonded directly to silicon atom.

2. A heat-resistant resin composition according to claim 1, wherein the resin system comprises about 10 to 40% by weight of the component (a), about 30 to 70% by weight of the component (b) and about 2 to 30% by weight of the component (c).

3. A heat-resistant resin composition according to claim 2, wherein the component (a) is a product wherein 100 parts by weight of a maleimide compound are modified with 2 to 35 parts by weight of furfuryl alcohol.

4. A heat-resistant resin composition according to any of claims 1 to 3, wherein the component (c) is a polyvinyl formal having a molecular weight in the range from 40,000 to 60,000 and a formalization degree of 80% or more.

* * * * *